Inventor
Herbert K. Weiss

Patented Feb. 8, 1949

2,460,863

UNITED STATES PATENT OFFICE 2,460,863

FIRE CONTROL

Herbert K. Weiss, Camp Davis, N. C.

Application July 10, 1943, Serial No. 494,175

9 Claims. (Cl. 235—61.5)

(Granted under the act of March 3, 1883, as amended April 30, 1928; 370 O. G. 757)

The invention described herein may be manufactured and used by or for the Government for governmental purposes without the payment to me of any royalty thereon.

This invention relates to improvements in smoothing devices used principally in gun fire control directors or computers. Such directors are used principally in firing on moving targets such as aerial or surface ships and, in general, comprise means for setting in values of range, instantaneous angular position relatively to predetermined base lines, or the line between director and target, and the component angular rates at which such line moves about predetermined axes through the director position. These values are then combined by the director and output values of the correct train and elevation angles for the gun are continuously supplied thereby. The aforesaid angular rates are usually taken as the rates about vertical and horizontal axes, of the line from the director to the target as determined by sound locators, sights, or radar. The device for determining the instantaneous position of the line between director and target is manually controlled and is subject to small unavoidable erratic operation on the part of the operator which introduces so-called tracking errors. Since a smooth tracking rate is essential to satisfactory operation of the director it is customary to provide a smoothing device interposed between the drive from the tracking member, viz., the sight, sound locator or radar, to the corresponding input of the director.

It is the object of this invention to devise new means having peculiar advantages for smoothing out these perturbations, leaving the fundamental rate—that of the target without the perturbations—to be passed on to the predictor or director for prediction. For this purpose I have shown two embodiments of my invention in the accompanying drawing, wherein.

Figure 1:
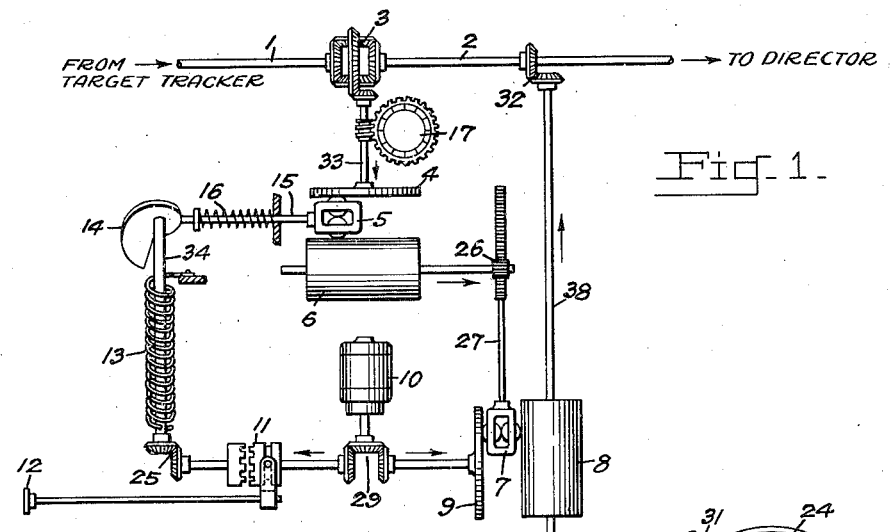
Fig. 1 is a diagrammatic illustration of a simple single-stage smoother.

A constantly operating constant speed motor 10 drives, through the bevel gears 29, shown in Fig. 1 the variable speed drive 9, 7, 8, more particularly, the constant speed disc 9 thereof. The output shaft 30 of the variable speed drive 9, 7, 8, on which the cylinder 8 of the drive is secured, is connected by bevel gears 32 to the smoothed rate shaft 2 which is connected as the input to the director or predictor (not shown). Smoothed rate shaft 2 is connected to the right bevel gear of a differential 3, the left coaxial bevel gear of which is secured on the tracking rate shaft 1, coming from the tracking device (not shown). By means of differential 3, the rate from the variable speed drive 9, 7, 8, as applied to smoothed rate shaft 2, is matched with the rate from the tracker, as applied to tracking rate shaft 1. Fig. 1 represents the improved smoothing device of this invention. In the ordinary smoothing device, the third shaft 33, of the differential 3, would be connected directly to the ball cage 7, (i. e., to rod 27 supporting ball cage 7) of the variable speed drive 9, 7, 8. The next few remarks refer to the ordinary smoothing device, and not to the improved smoothing device of this invention. If rates of motion of shafts 1 and 2, are not equal, the difference is obtained by differential 3 and applied through intermediate mechanisms to reposition ball carriage 7 in a direction to more nearly equalize the rates. Because the ball cage does not respond instantly, there is a lag in the rate matching operation which tends to smooth the rate 1. It can be shown easily by mathematics that the slower the ball cage 7 responds to a change in rate on shaft 1, the better it will smooth a perturbation superimposed on the basic rate of shaft 1, but, also, that the time required to reach a measurement of this basic rate from any other measurement of a previous rate (this is commonly known as the "settling time" of the smoother) will be correspondingly lengthened. The term "differential" as used in this specification is specifically applied to a common form of gear train in which three members are represented by two coaxial sun gears, and a third coaxial ring gear member having planetary pinion gears revolubly mounted therewithin meshed with the two first named so as to transmit torque force from or to the third member equally. However, the term is not limited to this exact form of gearing and is intended to include equivalents.

It follows that, in smoothers of past design, a compromise must be struck between settling time and smoothing ability, for if smoothing was heavy, the time required to settle to adequate data would be excessive, and with quick settling time little smoothing could be obtained.

By providing a variable time constant, however, the question of excessive "settling time" is eliminated and any desired amount of smoothing can be obtained with the smoothing system. One method of accomplishing this variable time constant (there are others, and it is not the intent of this description to limit the application to the particular method here described) is by interposing a small variable speed device as, for instance, at 4, 5, 6 between differential 3 and ball cage 7, so that it is possible, by changing the position of ball cage 5 of the small variable speed drive, to change the degree which a given movement of output from differential 3 will cause the ball cage 7 of the main variable speed drive to be displaced, thereby changing the time constant, and the settling time of the smoother.

As mentioned above, in the ordinary smoother, the output shaft 33 of the differential 3 would be connected directly to the rod 27 to which the ball cage 7 of the variable speed drive 9, 7, 8 is attached. However, in the improved smoother of this invention, the shaft 33 is connected to the rod 27 through a second variable speed drive 4, 5, 6, the input disc 4 of which is secured to shaft 33 and output cylinder 6 of which is connected to the rod 27 through pinion and rack 26. The position of ball cage 5 may optionally be varied at any predetermined time to progressively change the time constant and the settling time of the smoother, in a manner to be described. Ball cage 5 is secured at one end of a rod 15, the other end of which is maintained in contact with edge cam 14 by compression spring 16. Cam 14 is secured on a shaft 34 which is driven at times through bevel gears 25 and a clutch 11 from the left gear of the aforedescribed bevel gear drive 29 of the constant speed motor 10. Coil, torque spring 13 associated with cam shaft 34 serves to return cam 14 and ball cage 5 to their starting positions whenever the connection from cam to motor 10 is broken; clutch 11 controlled externally by knob 12 being a possible method of coupling and uncoupling the motor drive to and from the cam 14 and the ball cage 5. The motor drive operates to move the ball cage 5 from its outermost position when the time constant of the smoother is short to a position close to the center, perhaps even at the center of the small variable speed drive, where the time constant of the smoother becomes large.

The tracker picks up target as usual, and a rate, perturbed by errors appears on shaft 1. The smoother, having at this stage a very short time constant, quickly matches the rate, settling in a very few seconds, but doing little smoothing. When input data seems good (as would be indicated if operation continues a short time without indication of abrupt change of rate), the operator by operating knob 12 closes clutch 11, which by allowing the motor 10 to drive ball cage 5 from cam 14 causes the time constant of the smoother gradually to lengthen, attenuating more and more the perturbation of the rate received from the tracker. Finally, if the ball cage 5 is allowed to reach and remain at the center of disc 4 the output rate on shaft 2 is constant and is affected no more by perturbations of input.

The effect is that of beginning to track with a director no worse than a present standard director with no smoothing, but of having output data improve with tracking time, until if the target has flown a straight line, constant speed course, the rate determination will eventually be as perfect as the mechanical accuracies of the director allow. No penalty is paid for heavy smoothing in the form of long settling time as in smoothers heretofore used where no usable data at all was obtained until the smoothing circuit was settled. Hence, all courses, however short, can be fired upon with output data improving directly with tracking time.

For surveillance of the solution after ball cage 5 has reached the center of disc 4, a dial 17 is geared to the output shaft 33 of differential 3, which indicates the difference between the input rate 1 and the smoothed rate 2. It should be understood that with the device constructed as in Fig. 1, and without the use of the cam 14, the initial positions of the parts would be with the cage 7 on the axis of disc 9 and therefore inoperative to transmit motion through the cylinder 8 to shaft 2, and the cage 5 of the first variable speed device would be as shown, the shafts 1, 2 and 33 being stationary. In this condition, if any motion is imparted to tracking rate shaft 1, in either direction, as would occur in the beginning of an encounter with a moving airplane target (the immediate results of which movement, if incident to bringing a telescope sight into first bearing on the target may be disregarded), motion is transmitted through shaft 1 to the first differential. If the movement so transmitted is clockwise resulting from right traverse, motion of the shaft 2 being opposed by the zero position of the cage 7, the pinions of the differential 3 will travel on the right coaxial gear, carrying the ring gear clockwise at double the speed of shaft 1 and operating the third shaft 33, dial 17, and input disc 4, of the first variable speed drive. The resultant motion of the cylinder 6 raises the cage 7. This gradually begins and increases the rate of movement of the shaft 2 in a direction the opposite of that of shaft 1, until the speed of the latter is matched in shaft 2. At this stage, there being no difference in rate between shafts 1 and 2, motion of the ring gear of the first differential ceases, and the dial 17 and parts 4, 5, 6 likewise become still. This holds the cage 7 at the position which effected the matching of motions of shafts 2 and 1, and the shaft 2 is then being operated by the motor 10 without aid from shaft 1. The latter is also being operated in the direction and speed as manually developed, due to the ring gear of the first differential serving as a stationary support for the planetary pinions, so that they transmit reverse motion of the right hand concentric gear to the left one. The gun crew tracker or other tracker operating the manual mechanism keeps his hand on and moving with the crank or the like, although propulsion thereof may not be required. Should movement of the target or error in preceding manipulation involve need for increased rate of movement of the tracker shaft 1, the operator applies force enough to increase the rate in this shaft. For the moment the shaft 2 is under operation by motor 10 of the previously set rate, and the motor opposes increase thereof. In consequence the pinions of the first differential travel somewhat faster on the right gear and acquire a translative or planetary movement by which motion through the ring gear, and shaft 33 is transmitted to the dial 17 and disc 4, resulting in a still further lift of the ball cage 7 with consequent increased speed transmitted to shaft 2, until motion of shaft 1 is again matched and dial 17 and disc 4 become stationary. Should the imposed rate of shaft 2 be too high, the operator retards the motion of the shaft 1 so that this time the predominant motion in shaft 2 being in a reverse direction, the planetary motion of the pinions is the reverse of that of the shaft 1, and the shaft 33 and disc 4 are likewise moved in a direction the reverse of that first applied, although shafts 1 and 2 continue their original direction of movement. This reversed motion in the first variable speed device serves to lower the cage 7, and reduces the speed of shaft 2 and this reduced movement of shaft 2 finally matches that of shaft 1; the elimination of difference in rate again bringing motion of the shaft 33 and dial to an end. As long as this dial rotates slightly, first in one direction and then in the other, it may be assumed that the target is flying in a straight line and that the dial rotation is caused by tracking and ranging errors. However, when the dial commences to rotate continuously in one direction or the other, it is an indication that the target has changed or is changing course, and upon adjustment of control 12 a new "pseudo memory point" is assumed, and the process of improving the rate renewed. However, there will be a predominance, if not a continuance of motion of the dial in one direction due to change of the angle of approach, and if the target is not destroyed before crossing and continues on a rectilinear course, a predominance of dial movement in an opposite direction in the departing leg of the course. The device will function similarly on tracking movement in a direction the reverse of that first described except that all motions are reversed, except that of the motor 10, the cage 7 being below the axis of disc 9, so that a reverse of movement transmitted from this disc to cylinder 8 is effected.

Figure 2:
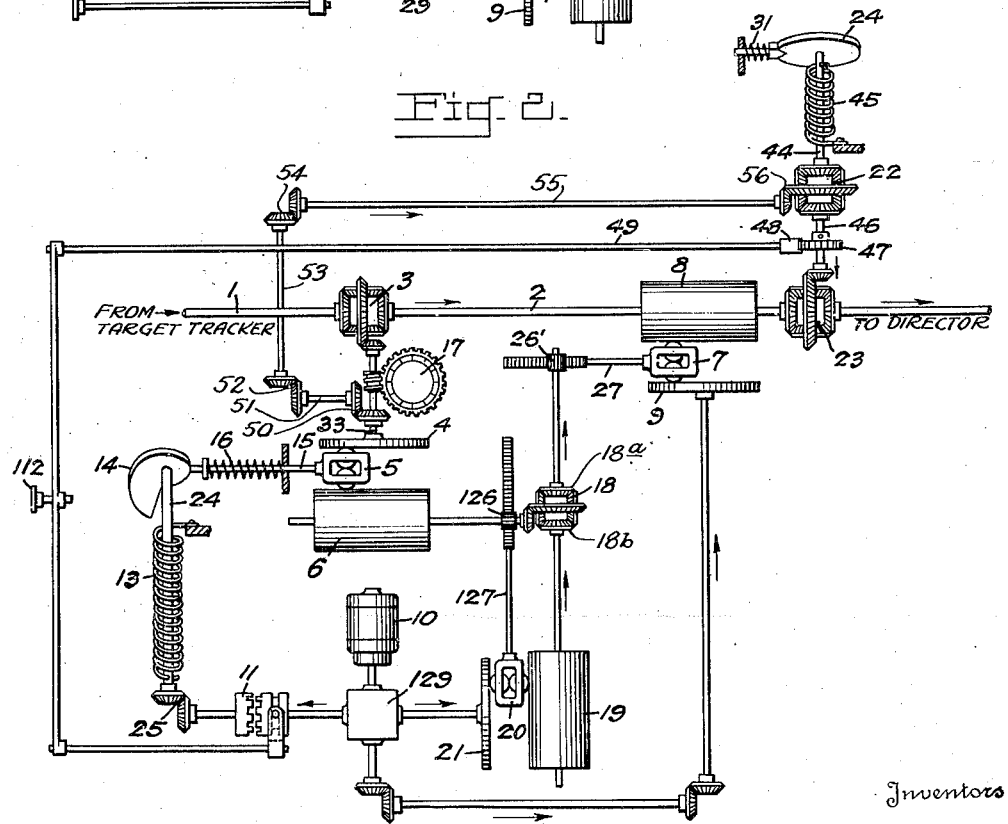
Fig. 2 is a diagrammatic illustration of a two-stage smoother.

The principle applied to the single stage smoother of Fig. 1 can be applied to any multi-stage smoother; the variable time constant is shown applied to a multi-stage smoother in Fig. 2. In this species the output shaft of cylinder 6 of first variable speed drive 4, 5, 6 is connected to ball cage 7 of second variable speed drive 9, 7, 8, the pinion and rack being designated 26' in correspondence with Fig. 1. There is interposed in this circuit a differential 18. One output branch 18a of differential 18, goes to the variable speed drive 9, 7, 8 as in the species of Fig. 1. The other branch 18b is connected to the output shaft of a cylinder 19 of a third variable speed drive 21, 20, 19, the ball cage 20 of which is connected by rod 127 and a rack and pinion 126 to the output shaft from cylinder 6 of the first variable speed drive 4, 5, 6, i. e., between the output shaft and the aforedescribed differential 18. The purpose of this additional variable speed drive, 19, 20, 21, is to place ball cage 7 in whatever position may be required for the correct output rate at drum 8 without an actual position lag between shafts 1 and 2 being necessary. Shaft 2 is then a smoothed version in both position and rate of shaft 1 for substantially constant rate on shaft 1, whereas the simpler circuit of Fig. 1 has a position lag across differential 3 for substantially constant rate on shaft 1.

In the case of this two-stage smoother, however, it is necessary to maintain position orientation between shafts 1 and 2, that is, to give shaft 2 the same angular position with respect to shaft 1 whenever shaft 1 is brought to rest. This orientation, automatically maintained in the original design of the smoothing circuit with constant settling time, is no longer maintained, because of the interposition of the small variable speed drive 4, 5, 6 which when its ball cage 5 has reached the center of disc 4 effectively uncouples the output of differential 3 from the remainder of the circuit. In this condition, the course is transmitted to the director for prediction and gun pointing is generated entirely by variable speed drive 7, 8, 9. Shaft 33 is connected over a drive comprising bevel gears 50, shaft 51, bevel gears 52, shaft 53, bevel gears 54, shaft 55 and bevel gear 56, to the center of differential 22. One side of this differential drives a shaft 44 having a heart-shaped cam 24 secured thereto. A spring 45 is fixed at one end and has its other end attached to shaft 44 to thereby urge cam 24 into an initial position of rotation determined by a spring-pressed detent 31 acting upon the periphery of the cam.

The other side of differential 22 is connected by shaft 46 to a differential 23, to which is also connected the cylinder 8 of the variable speed drive 9, 7, 8, and the shaft leading to the director or other apparatus. On the output shaft 46 is secured a rack wheel 47 with which cooperates a dog 48 at the end of a rod 49 which is controlled from the manual knob 112. As in the case of the single-stage smoother of Fig. 1, dial 17 remains as a visual indicator of the rate difference between input and output (which may be calibrated in yards if desired) but in the case of the multi-stage smoother of Fig. 2, this difference is also led to differential 22 and during operation of the smoother is allowed freely to rotate cam 24 and tension spring 45. When manual knob 112 is operated to close the clutch 11, for the purposes explained above in connection with Fig. 1, the dog or motion stop 48 is withdrawn from locking engagement with rack wheel 47, thus freeing the heart-shaped cam 24 to its now-tensioned return spring 45. Then as heart cam 24 is restored to zero position the difference between shafts 1 and 2 which is present on shaft 44 is added to the output of drum 8 by differential 23, causing the smoothed position supplied to the director to be re-oriented with the rough input data.

It is thus seen that there is provided a mechanical smoothing circuit whereby the ability of the circuit to attenuate perturbations of input is caused to increase with time with the option of eventually causing the circuit to settle on a constant rate which ignores further changes in input until caused to renew its cycle of operation at the choice of the operator. The advantages of quick settling time and heavy smoothing are thereby combined, neither detracting from the other. The operator is allowed surveillance of the operation by a dial which compares smoothed rate with input rate and is given, in this manner, an indication of systematic departure of the target from the settled rates, whereupon the settled rates may be released and process of obtaining new measurements followed.

I claim:

1. In a smoothing device connected to the output tracker shaft of a tracking device and the smoothed rate input shaft of a director, the combination of a differential gearing connected between the said shafts, said gearing having a third shaft, a variable speed drive having an input disc connected to the third shaft and having a driven output member and an interposed ball cage, a constant speed motor, a cam connected to said ball cage, yielding means engaged with the cam tending to hold it at a normal initial position, a releasable connection between the cam and motor, the normal position of the cam and the connected ball cage being such that the latter is adjacent the rim of the input disc whereby maximum motion is then transmitted to the output member, a second similar variable speed drive, the input disc of which is operatively connected to the motor, the output member of the second variable speed drive being connected to drive the said smoothed rate shaft, the ball cage of said second variable speed drive being connected for operation by the said output member of the first said variable speed drive, and means to engage said releasable connection to cause the cam to be turned from its said normal position and move the said ball cage of the first variable speed drive from its said normal position toward the center of the disc, whereby the first said variable speed drive transmits motion to adjust said second variable speed drive at a progressively decreasing rate whereby said second variable speed drive operates said smoothed rate shaft at a rate proportionate to a mean of the rates of the output shaft, with diminished fluctuations proportionate to the rate differences between the input and output shafts and the time the motor is connected to the cam.

2. In a smoothing device connected to the output tracking rate shaft of a tracking device and the smoothed rate input shaft of a director, the combination of a differential gearing connected between the said shafts and having a third shaft, a variable speed drive having an input member connected to the third shaft an output member and a movable rate-changer connected between the input and output members, a constant speed motor, a cam connected to the rate changer, the said cam being loaded to tend to assume a normal initial position such that the rate changer is at its maximum rate output position, whereby maximum motion is transmitted initially between the input and output members of the said variable speed drive, a second similar variable speed drive the input member of which is connected to said motor, its output member connected to the said smoothed rate shaft, and its rate changer connected to the said output member of the first variable speed drive, and releasable means to operatively connect the motor and cam to turn the cam from its normal position and move the said rate changer of the first variable speed drive away from its normal position whereby the first said variable speed drive transmits motion at a progressively decreasing rate to its output member.

3. In a smoothing device connected to a tracking rate output shaft of a tracking device and the smoothed rate input shaft of a director, the combination of a differential gearing connected between the said shafts having a third shaft, a constant speed motor, a cam loaded toward a normal initial position, a clutch connection therefrom to the motor, a variable speed drive having an input member connected to the said third shaft and having a speed control, a follower on the said cam operatively connected to said speed control of said variable speed drive so that the latter is normally at its maximum rate output position, a second similar variable speed drive the output member of the first variable speed drive being connected to the speed control of the second variable speed drive, the output member of the second variable speed drive connected to the smoothed rate shaft and means for closing the said clutch to cause the cam to be turned from its said normal position to move the speed control of the first variable speed drive so as to transmit motion at a progressively decreasing rate depending upon the rate difference between the tracking rate shaft and the smoothed rate shaft, to the speed control of said second variable speed drive and so that the latter will drive the smoothed rate shaft at a rate depending both upon the rate difference between the tracking and smoothed rate shafts and upon the time that the clutch remains closed.

4. In a smoothing device connected between a tracking rate output shaft of a tracking device and the smoothed rate input shaft of a director, the combination of a differential gearing connected to the tracking rate shaft and the smoothed rate shaft and having a third element, a variable speed drive operatively connected to the said third element, a second variable speed drive operatively connected between the first variable speed drive and the smoothed rate shaft, and means operable over variable time periods to control the first variable speed drive to transmit motion at a progressively decreasing rate to the smoothed rate shaft.

5. In a smoothing device adapted to be connected to a tracking rate output shaft of a tracking device and a smoothed rate input shaft of a director, the combination of a differential gearing connected between the tracking rate shaft and the smoothed rate shaft and having a third shaft, a variable speed drive having an input disc connected to the third shaft and having an output member and an interposed changeable connector, a cam connected to said changeable connector, the said cam being loaded toward a normal position, the normal position of the cam and the connected changeable connector being such that the latter is normally disposed eccentrically on the disc whereby a maximum motion is initially transmittable between the said input disc and the output member of the variable speed drive, a second similar variable speed drive, a constant speed motor connected to the input disc thereof, the variable connector of the second variable speed drive connected to the said output member of the first variable speed drive, a third similar variable speed drive, the output member thereof connected to the said smoothed rate shaft and the input disc thereof operatively connected to said constant speed motor, a second differential gearing connected between the output member of the second variable speed drive and the changeable connector of the third variable speed drive, the third shaft of the second differential being connected to the said output member of the first mentioned variable speed drive, a means to at will connect the said cam and motor to turn the cam from its said normal position to progressively move the said changeable connector of the first variable speed drive from its said normal position whereby the first variable speed drive transmits progressively decreasing motion resultant upon the rate difference between the tracking rate shaft and the smoothed rate shaft, a third differential included in the smoothed rate shaft, and means to yieldingly oppose rotation of the third shaft of the third differential.

6. In a smoothing device adapted to be connected to a tracking rate output shaft of a tracking device and a smoothed rate input shaft of a director, the combination of a differential gearing connected between the tracking rate shaft and the smoothed rate shaft and having a third shaft, a variable speed drive having an input disc connected to the third shaft and having an output member and an interposed changeable connector, a cam connected to said changeable connector, the said cam being loaded toward a normal position, the normal position of the cam and the connected changeable connector being such that the latter is normally disposed eccentrically on the disc whereby a maximum motion is initially transmittable between the said input disc and the output member of the variable speed drive, a second similar variable speed drive, a constant speed motor connected to the input disc thereof, the variable connector of the second variable speed drive connected to the said output member of the first variable speed drive, a third similar variable speed drive, the output member thereof connected to the said smoothed rate shaft and the input disc thereof operatively connected to said constant speed motor, a second differential gearing connected between the output member of the second variable speed drive and the changeable connector of the third variable speed drive, the third shaft of the second differential being connected to the said output member of the first mentioned variable speed drive, a means to at will connect the same cam and motor to turn the cam from its said normal position to progressively move the said changeable connector of the first variable speed drive from its said normal position whereby the first variable speed drive transmits progressively decreasing motion resultant upon the rate difference between the tracking rate shaft and the smoothed rate shaft, a third differential included in the smoothed rate shaft, a heart-shaped cam, a fourth differential connected between the said cam and the third shaft of the third differential, a spring-pressed detent normally engageable in the notch of the said heart-cam, spring means connected to and urging the cam toward normal position, a stop motion for the last named shaft, a driving connection between the third output shaft of the first differential and the third shaft of the fourth differential whereby the heart-cam, is turned away from its said normal position, and means to disengage the stop motion.

7. In a rate smoother, an input member, an output member, a first variable speed device, means driving said device by and in proportion to any difference in rates between said members, a second variable speed device, a driving connection between the output of said second variable speed device and said output member, means operable to vary the speed ratio of said second variable speed drive by and in response to the output of said first variable speed drive, and manually controlled means operable to vary the speed ratio of said first variable speed drive.

8. In a rate smoothing device, an input shaft, an output shaft, a differential having first and second sides connected to said shafts, respectively, first and second variable speed drives, means driving said first variable speed drive from the third side of said differential, means drivingly connecting the output of said first variable speed drive to vary the speed ratio of said second variable speed drive, power means driving said second variable speed drive, a driving connection between the output of said second variable speed drive and said output shaft, and manually-controlled means operable to vary the speed ratio of said first variable speed drive.

9. In a rate smoother, an input member, an output member, a first differential connecting said members, a first variable speed device having an input driven by said first differential in proportion to the difference in rates of movement of said members, a second variable speed device having its output connected to drive said output member, means responsive to the output of said first variable speed device to adjust the speed ratio of said second variable speed device, an energy-storing device responsive to the total operation of the input of said first variable speed device, and manually-controlled means operable to connect said energy-storing device to increase the movement of said output member.

HERBERT K. WEISS.

REFERENCES CITED

The following references are of record in the file of this patent:

UNITED STATES PATENTS

| Number | Name | Date |
| --- | --- | --- |
| 1,415,601 | Meitner | May 9, 1922 |
| 2,049,375 | Henderson | July 28, 1936 |
| 2,136,213 | Hodgman | Nov. 8, 1938 |
| 2,248,072 | Fry | July 8, 1941 |
| 2,377,898 | Myers | June 12, 1945 |
| 2,378,910 | Chaffee et al. | June 26, 1945 |